Dec. 18, 1956   C. P. KELLEY   2,774,219
AUTOMOBILE REFRIGERATING APPARATUS
Filed Oct. 27, 1954
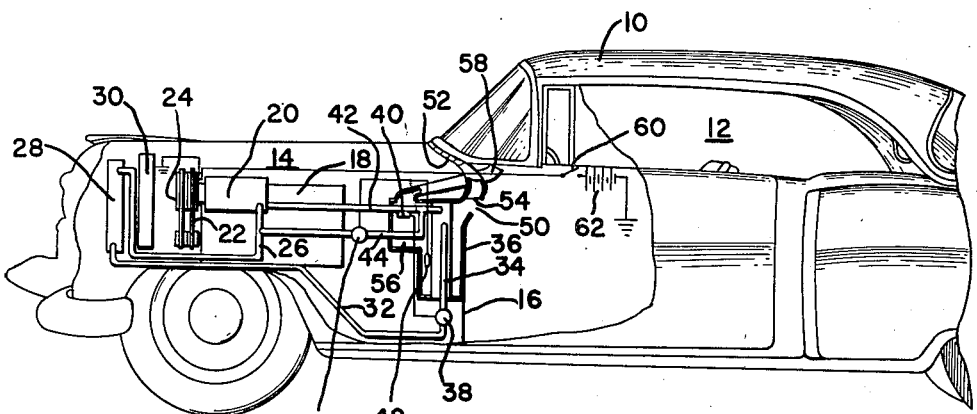
Fig. 1
Fig. 2
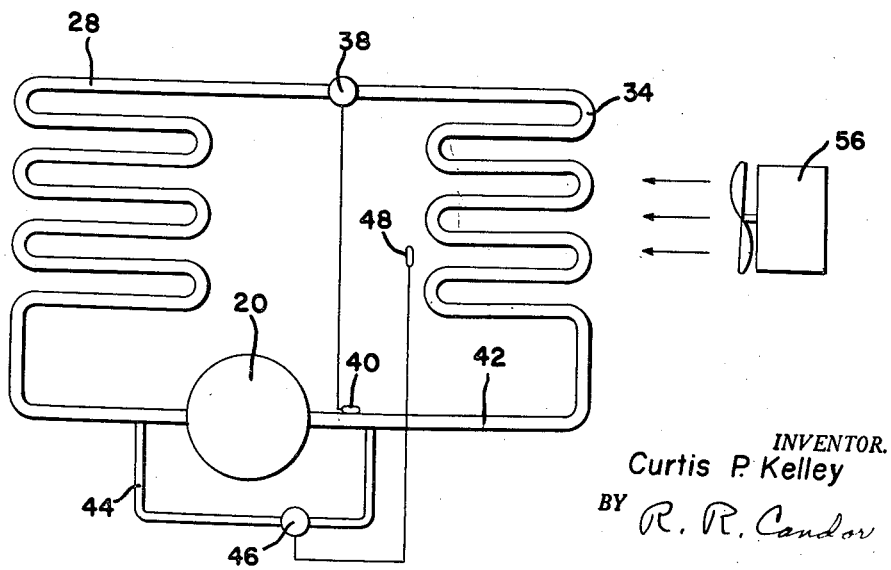
INVENTOR.
Curtis P. Kelley
BY R. R. Candor
His Attorney

United States Patent Office 2,774,219
Patented Dec. 18, 1956

2,774,219

AUTOMOBILE REFRIGERATING APPARATUS

Curtis P. Kelley, Dayton, Ohio, assignor to General Motors Corporation, Detroit, Mich., a corporation of Delaware Application October 27, 1954, Serial No. 465,094

7 Claims. (Cl. 62—3)

This invention relates to refrigerating apparatus and more particularly to an automobile air conditioning system.

A number of problems present themselves in designing an automobile air conditioning system and control therefor which are not present in designing other types of air conditioning systems and controls. Some of the problems result from the fact that the car engine which is used for driving the refrigerant compressor operates at widely varying speeds without any regard for the refrigeration requirements. This discrepancy between the compressor speed and the refrigeration requirements is greatly aggravated by the fact that the evaporator must of necessity be made small in order to fit into the available space. It is an object of this invention to provide a control which is suitable for use in a refrigeration system where the output of the compressor is at times completely out of proportion to the evaporator capacity and the refrigeration load.

It is another object of this invention to provide a control which makes it possible to use a small evaporator in combination with a compressor having unproportionally large capacity without causing objectionable accumulation of frost on the evaporator.

Still another object of this invention is to provide an improved refrigeration control which may be manufactured at a low cost and which is capable of withstanding the jarring and other abuse to which the refrigeration equipment on an automobile is subjected.

Further objects and advantages of the present invention will be apparent from the following description, reference being had to the accompanying drawings, wherein a preferred form of the present invention is clearly shown.

In the drawings:

Figure 1 is an elevational view, with parts broken away, showing somewhat diagrammatically an air conditioning unit constructed in accordance with the invention; and, Figure 2 is a diagrammatic view of the refrigerant circuit and the controls therefor.

Referring now to the drawing wherein a preferred embodiment of the invention has been shown, reference numeral 10 generally designates a conventional passenger vehicle having a passenger compartment 12 and an engine compartment 14 separated from one another by means of the usual fire wall 16. The main car engine 18 which is mounted in the engine compartment 14 in accordance with standard practice serves to supply power for operating the vehicle as well as for driving the refrigerant compressor 20. Power from the engine 18 is transmitted to the compressor through the usual belts 22 and a magnetically operated clutch 24.

The air conditioning equipment is preferably mounted wholly within the engine compartment of the car so as not to utilize valuable space in the passenger and luggage compartment of the car and so as to make it possible to install the refrigeration apparatus as a package unit. The compressor 20 serves to discharge the compressed refrigerant into the line 26 which leads to a condenser 28 which is preferably located directly in front of the main engine radiator 30 so as to be cooled and condensed by the incoming air which cools the engine radiator in accordance with standard practice. The condensed refrigerant flows through a liquid line 32 into an evaporator 34 mounted in an evaporator and blower housing 36 which is preferably located adjacent the front side of the dashboard or fire wall 16.

The flow of liquid refrigerant through the line 32 is controlled by a conventional thermostatic expansion valve 38 which is provided with the usual thermal bulb 40. The thermal bulb 40 is arranged in thermal exchange relationship with the refrigerant outlet line 42 which leads from the evaporator to the compressor and normally serves to control the operation of the valve 38 so as to throttle the flow of refrigerant into the evaporator when the liquid refrigerant enters the evaporator at a greater rate than necessary to keep the evaporator filled with refrigerant. When the liquid refrigerant enters the suction line 42 the refrigerating effect thereof cools the thermal bulb 40 so as to cause the expansion valve to close or partially close in accordance with well known practice. If this should happen at a time when the cooling load is light and the compressor is being driven at a high speed, the suction pressure would quickly drop so low that the evaporator would operate at a temperature low enough to freeze any moisture which would condense on the evaporator.

In order to prevent this from happening, there is provided a by-pass line 44 which connects the outlet of the compressor to the outlet of the evaporator so as to convey hot refrigerant vapor from the outlet of the compressor to the outlet of the evaporator at a point ahead of the thermostatic bulb 40. The flow of refrigerant through the by-pass line 44 is controlled by a thermostatically operated valve 46 which includes a temperature responsive bulb 48 located so as to respond to the temperature of the evaporator. This bulb can be mounted directly on the evaporator tubing or fin structure or it may be mounted in the air stream leaving the evaporator as shown. When the temperature of the air leaving the evaporator drops below a predetermined value corresponding to a value below which frost might form on the evaporator, the valve 46 would open so as to allow the hot refrigerant vapor to flow through the by-pass. The hot refrigerant vapor thus by-passed and admitted to the suction line leading from the evaporator to the compressor serves two important purposes. In the first place the hot vapor serves to increase the suction pressure so as to cause the pressure within the evaporator to be high enough to prevent freeze-up of the evaporator. By introducing the hot gas at a point ahead of the thermostatic bulb 40 the heat from the gas will artificially heat the bulb 40 so as to prevent unwanted closing of the expansion valve 38 and will aid in vaporizing excess liquid refrigerant entering the suction line.

By virtue of the above described arrangement it is obvious that the air conditioning system will be controlled in such a manner that the condensate on the evaporator will not be permitted to freeze and block the air flow over the evaporator. At the same time the temperature within the passenger compartment can be closely regulated by using conventional inexpensive controls. The housing 36 in which the evaporator is located is adapted to be supplied with recirculated air through an air inlet 50 which communicates with the passenger compartment of the car. Fresh air may be introduced into the housing through the fresh air intake means 52. A control damper 54 is arranged as shown and may be used to control the proportions of fresh air and recirculated air entering the housing 36. The conditioned air is discharged by the usual blower 56 into the passenger compartment of the car via the discharge duct 58. For purposes of illustration, the duct 58 has been shown as discharging the conditioned air into the front portion of the passenger compartment, whereas any suitable air distributing duct arrangement could be provided without departing from the spirit of the invention. A manual switch 60 is provided as shown for controlling the flow of current from the usual car storage battery 62 to the solenoid operated clutch 24 so as to provide a convenient means for controlling the operation of the refrigeration equipment.

While the form of embodiment of the invention as herein disclosed constitutes a preferred form, it is to be understood that other forms might be adopted, as may come within the scope of the claims which follow.

What is claimed is as follows:

1. In an air conditioning system, a compressor, a condenser, an evaporator contacted by flowing air, refrigerant flow connections between said compressor, condenser, and evaporator, a thermostatic expansion valve in said connections adjacent the inlet of said evaporator, said thermostatic expansion valve including thermal means responsive to the temperature at the outlet of said evaporator for controlling the flow of refrigerant through said valve, means responsive to the temperature of the air flowing away from the evaporator for preventing operation of said evaporator whenever the evaporator is at a temperature below the freezing temperature of condensation which might form thereon, said last named means comprising means for applying heat to said thermal means sufficient to actuate said valve in response to a predetermined decrease in the temperature of air leaving said evaporator.

2. In an air conditioning system, a compressor, condenser, an evaporator, refrigerant flow connections between said evaporator, compressor, and condenser, valve means for controlling the admission of liquid refrigerant into said evaporator, control means responsive to the temperature of and at all times during the operation of the system in heat transfer relationship with all the refrigerant leaving said evaporator for controlling said valve means, and means responsive to the temperature of said evaporator for circulating sufficient relatively hot compressed gas leaving said compressor in thermal exchange relationship with said temperature responsive control means to heat the control means to actuate said valve means.

3. In an air conditioning system, a compressor, a condenser, an evaporator, refrigerant conduit connections connecting said evaporator, compressor, and condenser in series refrigerant flow relationship, valve means for controlling the admission of liquefied refrigerant into said evaporator, means including a thermostat responsive to the temperature of the refrigerant in the conduit connection leaving said evaporator for controlling said valve means, and means for by-passing refrigerant from the outlet of said compressor to said conduit connection between the outlet of said evaporator and said thermostat.

4. In an air conditioning system, a compressor, a condenser, an evaporator, refrigerant conduit connections connecting said evaporator, compressor, and condenser in series refrigerant flow relationship, valve means for controlling the admission of liquefied refrigerant into said evaporator, means including a thermostat responsive to the temperature of the refrigerant in the conduit connection leaving said evaporator for controlling said valve means, by-pass means for by-passing refrigerant from the outlet of said compressor to said conduit connection between the outlet of said evaporator and said thermostat, and means responsive to the temperature of said evaporator for controlling the flow of refrigerant through said by-pass means.

5. In a vehicle; a main engine for propelling said vehicle at widely varying speeds; refrigerating apparatus for cooling air for use in said vehicle; said apparatus comprising a compressor, a condenser, an evaporator, and refrigerant conduit means connecting said compressor, condenser and evaporator in series refrigerant flow relationship; torque transmitting means between said engine and said compressor whereby said compressor is operated at widely varying speeds independent of refrigeration requirements; a thermostatic expansion valve in said refrigerant conduit means for controlling the admission of liquid refrigerant into said evaporator; said thermostatic expansion valve including a temperature responsive bulb arranged in heat exchange with said conduit means adjacent the outlet of said evaporator; means for by-passing compressed refrigerant directly from the outlet of said compressor into said conduit means between said evaporator and said bulb; and means responsive to the evaporator temperature for controlling the flow of refrigerant through said by-pass.

6. In combination; a vehicle having a passenger compartment and an engine compartment; an engine within said engine compartment for propelling said vehicle at widely varying speeds; air conditioning apparatus for cooling air for use in said passenger compartment; said air conditioning apparatus including a housing mounted between said engine compartment and said passenger compartment, an evaporator in said housing, means for circulating air from said passenger compartment in thermal exchange relationship with said evaporator and for discharging the air thus cooled into said passenger compartment, a condenser, a compressor, torque transmitting means between said compressor and said engine, refrigerant conduit connections between said compressor, condenser, and evaporator, and a thermostatic expansion valve in said connections adjacent the inlet side of said evaporator for controlling the admission of liquid refrigerant into said evaporator; said thermostatic expansion valve including thermal means responsive to the temperature of the refrigerant in the conduit connection leaving said evaporator for throttling the flow of refrigerant to said evaporator at low evaporator outlet temperatures; and means responsive to a predetermined decrease in the temperature of said evaporator for by-passing compressed refrigerant from the outlet of said compressor into said conduit connection between said evaporator and said thermal means.

7. In combination; a vehicle having a passenger compartment and an engine compartment; an engine within said engine compartment for propelling said vehicle at widely varying speeds; air conditioning apparatus located in said engine compartment for cooling air for use in said passenger compartment; said air conditioning apparatus including an evaporator; means for circulating air from said passenger compartment in thermal exchange relationship with said evaporator and for discharging the air thus cooled into said passenger compartment, a condenser, a compressor, torque transmitting means between said compressor and said engine, refrigerant conduit connections between said compressor, condenser, and evaporator, and a thermostatic expansion valve in said connections adjacent the inlet side of said evaporator for controlling the admission of liquid refrigerant into said evaporator; said thermostatic expansion valve including thermal means responsive to the temperature of the refrigerant in the conduit connection leaving said evaporator; and means responsive to a predetermined decrease in the temperature of said evaporator for by-passing compressed refrigerant from the outlet of said compressor into said conduit connection between said evaporator and said thermal means so as to prevent evaporator temperatures from falling below the freezing temperature of the moisture condensed thereon.

References Cited in the file of this patent

UNITED STATES PATENTS

| | | |
|---|---|---|
| 2,264,821 | Zukoski | Dec. 2, 1941 |
| 2,286,961 | Hanson | June 16, 1942 |
| 2,319,005 | Lum | May 11, 1943 |
| 2,363,273 | Waterfill | Nov. 21, 1944 |
| 2,454,263 | Newton | Nov. 16, 1948 |
| 2,679,142 | McGrath | May 25, 1954 |